US011761360B2

(12) United States Patent
Liu et al.

(10) Patent No.: US 11,761,360 B2
(45) Date of Patent: Sep. 19, 2023

(54) CONTROL METHOD AND CONTROL SYSTEM FOR CONTINUOUSLY VARIABLE VALVE LIFT MECHANISM AND VEHICLE

(71) Applicant: GREAT WALL MOTOR COMPANY LIMITED, Hebei (CN)

(72) Inventors: Tao Liu, Baoding (CN); Fabao Yang, Baoding (CN); Liming Xu, Baoding (CN); Ji Yin, Baoding (CN); Jiajia Hu, Baoding (CN); Luping Liu, Baoding (CN); Song Zhang, Baoding (CN); Yanlong Fang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 41 days.

(21) Appl. No.: 16/620,596

(22) PCT Filed: Jun. 7, 2018

(86) PCT No.: PCT/CN2018/090304
§ 371 (c)(1),
(2) Date: Dec. 9, 2019

(87) PCT Pub. No.: WO2018/224020
PCT Pub. Date: Dec. 13, 2018

(65) Prior Publication Data
US 2020/0095909 A1 Mar. 26, 2020

(30) Foreign Application Priority Data
Jun. 9, 2017 (CN) .......................... 201710437393.6

(51) Int. Cl.
*F01L 13/00* (2006.01)
*F01L 1/053* (2006.01)
(Continued)

(52) U.S. Cl.
CPC ....... *F01L 13/0026* (2013.01); *F01L 13/0063* (2013.01); *F01L 1/053* (2013.01);
(Continued)

(58) Field of Classification Search
CPC .......... F01M 9/10; F01M 9/101; F01M 9/105; F01L 2001/0537; F01L 13/0026;
(Continued)

(56) References Cited

U.S. PATENT DOCUMENTS

2002/0166523 A1* 11/2002 Kabasin ............... F01L 13/0026
123/90.16
2005/0166895 A1* 8/2005 Yoshizawa ............ F02D 41/221
123/346
(Continued)

FOREIGN PATENT DOCUMENTS

CN 1834411 A 9/2006
CN 202611784 U 12/2012
(Continued)

OTHER PUBLICATIONS

International Search Report dated Aug. 30, 2018 in corresponding International application No. PCT/CN2018/090304; 6 pages.
(Continued)

*Primary Examiner* — Devon C Kramer
*Assistant Examiner* — Kelsey L Stanek
(74) *Attorney, Agent, or Firm* — Maier & Maier, PLLC

(57) ABSTRACT

A control method for a continuously variable valve lift mechanism includes: controlling a continuously variable valve lift mechanism to enter a limp mode when the continuously variable valve lift mechanism fails and disables an automatic valve lift changing function; driving and forcing the continuously variable valve lift mechanism to move to a maximum lift position; and triggering a self locking function to self lock the continuously variable valve lift mechanism (Continued)

at the maximum lift position when the continuously variable valve lift mechanism reaches the maximum lift position. A control system for a continuously variable valve lift mechanism, and a vehicle are also provided.

3 Claims, 3 Drawing Sheets

(51) Int. Cl.
    *F01L 1/18*         (2006.01)
    *F01L 1/26*         (2006.01)
    *F01L 1/34*         (2006.01)

(52) U.S. Cl.
    CPC ................. *F01L 1/18* (2013.01); *F01L 1/267* (2013.01); *F01L 1/34* (2013.01); *F01L 2013/0073* (2013.01); *F01L 2305/00* (2020.05); *F01L 2820/032* (2013.01)

(58) Field of Classification Search
    CPC . F01L 1/053; F01L 1/185; F01L 1/047; F01L 1/18; F01L 1/267; F01L 1/34; F01L 2013/0073; F01L 2820/032; F01L 2800/12; F02D 2041/001; F02D 2041/227
    USPC ...................................... 123/90.16
    See application file for complete search history.

(56) References Cited

U.S. PATENT DOCUMENTS

| 2007/0163525 | A1* | 7/2007 | Fuwa | F02D 13/0207 |
|---|---|---|---|---|
| | | | | 123/90.16 |
| 2010/0108005 | A1* | 5/2010 | Ito | F01L 13/0063 |
| | | | | 123/90.17 |
| 2013/0104819 | A1* | 5/2013 | Fernandez | F01L 13/0015 |
| | | | | 123/90.15 |

FOREIGN PATENT DOCUMENTS

| DE | 102004030851 A1 | | 1/2005 |
|---|---|---|---|
| JP | 2004183591 A | * | 7/2004 |
| JP | 2005214168 A | | 8/2005 |
| JP | 2008215164 A | | 9/2008 |

OTHER PUBLICATIONS

Indian Office Action dated Nov. 24, 2020, in connection with corresponding IN Application No. 202037000723; 6 pages.
Extended European Search Report dated Feb. 25, 2021, in connection with corresponding EP Application No. 18813824.2; 8 pages.

* cited by examiner

CONTROL METHOD AND CONTROL SYSTEM FOR CONTINUOUSLY VARIABLE VALVE LIFT MECHANISM AND VEHICLE

CROSS-REFERENCE TO RELATED APPLICATION

The present application claims priority to Chinese Patent Application Serial No. 201710437393.6, entitled "Control Method and Control System For Continuously Variable Valve Lift Mechanism and Vehicle", filed by the Great Wall Motor Company Limited on Jun. 9, 2017.

FIELD

The present disclosure relates to the technical field of automobiles, and particularly to a control method and a control system for a continuously variable valve lift mechanism and a vehicle.

BACKGROUND

With the increasingly serious environmental problem, low emission and environmental protection have become preconditions for an engine to enter the market. A load of the traditional gasoline engine is changed by changing a throttle valve to regulate air inflow. Under a small load condition, the throttle valve has a small opening, there exists a quite large vacuum degree behind the throttle valve, and a pumping loss is great in the process of breathing of the engine, which is an important reason why the gasoline engine works less efficiently than a diesel engine. To increase the efficiency of the engine, a continuously variable valve lift technology is proposed. In a related art, since a continuously variable valve lift mechanism has many electronic control components, a failure of the electronic control components may disable an automatic valve lift changing function of the continuously variable valve lift mechanism, and a vehicle fails to be started sometimes. Particularly, cold start is not able to be performed smoothly, and the vehicle breaks down, is unable to travel, and required to be trailed to a maintenance station by a trailer for maintenance, which affects the efficiency of maintaining the vehicle.

SUMMARY

The present disclosure is intended to propose a control method for a continuously variable valve lift mechanism, and with the method, a vehicle may be guaranteed to be started and travel smoothly when the continuously variable valve lift mechanism fails and disables an automatic valve lift changing function.

To achieve the above-mentioned objective, the present disclosure provides the technical solution as follows.

A control method for a continuously variable valve lift mechanism includes: controlling a continuously variable valve lift mechanism to enter a limp mode when the continuously variable valve lift mechanism fails and disables an automatic valve lift changing function; driving and forcing the continuously variable valve lift mechanism to move to a maximum lift position; and triggering a self locking function to self lock the continuously variable valve lift mechanism at the maximum lift position when the continuously variable valve lift mechanism reaches the maximum lift position.

Further, the failure of the continuously variable valve lift mechanism disabling the automatic valve lift changing function includes: a failure of an electronic control component of the continuously variable valve lift mechanism; and/or a failure of at least one phase in a three phase line of an electric motor.

Further, the continuously variable valve lift mechanism is configured such that at the maximum lift position, a resultant force of a roller assembly of the continuously variable valve lift mechanism on an eccentric wheel has a direction passing through an axis of an eccentric shaft, so as to self lock the continuously variable valve lift mechanism at the maximum lift position when the continuously variable valve lift mechanism reaches the maximum lift position in the limp mode.

Further, after the continuously variable valve lift mechanism is self locked at the maximum lift position, the method further includes: controlling an opening of a throttle valve to enable the vehicle to be started and travel.

Compared with the related art, the control method for the continuously variable valve lift mechanism according to the present disclosure has the following advantages.

With the control method for the continuously variable valve lift mechanism according to the embodiments of the present disclosure, when the continuously variable valve lift mechanism fails and disables an automatic valve lift changing function, the continuously variable valve lift mechanism is controlled to enter the limp mode, forced to move to the maximum lift position, and self locked at the maximum lift position after reaching the maximum lift position, thereby enabling the vehicle to be started and travel smoothly, facilitating a driver to drive the vehicle to a maintenance centre for maintenance, and increasing the efficiency of maintenance.

A second objective of the present disclosure is to propose a control system for a continuously variable valve lift mechanism, and with the system, a vehicle may be guaranteed to be started and travel smoothly when the continuously variable valve lift mechanism fails and disables an automatic valve lift changing function.

To achieve the above-mentioned objective, the present disclosure provides the technical solution as follows.

A control system for a continuously variable valve lift mechanism includes: a mode switching module configured to control a continuously variable valve lift mechanism to enter a limp mode when the continuously variable valve lift mechanism fails and disables an automatic valve lift changing function; and a drive module configured to drive and force the continuously variable valve lift mechanism to move to a maximum lift position, and trigger a self locking function to self lock the continuously variable valve lift mechanism at the maximum lift position when the continuously variable valve lift mechanism reaches the maximum lift position.

Further, the failure of the continuously variable valve lift mechanism disabling the automatic valve lift changing function includes a failure of an electronic control component of the continuously variable valve lift mechanism; and/or a failure of at least one phase in a three phase line of an electric motor.

Further, the continuously variable valve lift mechanism is configured such that at the maximum lift position, a resultant force of a roller assembly of the continuously variable valve lift mechanism on an eccentric wheel has a direction passing through an axis of an eccentric shaft, so as to self lock the continuously variable valve lift mechanism at the maximum lift position when the continuously variable valve lift mechanism reaches the maximum lift position in the limp mode.

Further, the control system further includes: a control module configured to control an opening of a throttle valve to enable the vehicle to be started and travel after the continuously variable valve lift mechanism is self locked at the maximum lift position.

The control system and the control method for the continuously variable valve lift mechanism have the same advantages relative to the related art, which will not be elaborated herein.

A third objective of the present disclosure is to propose a vehicle, and with the vehicle, the vehicle may be guaranteed to be started and travel smoothly when a continuously variable valve lift mechanism fails and disables an automatic valve lift changing function.

To achieve the above-mentioned objective, the present disclosure provides the technical solution as follows.

A vehicle is provided with the control system for the continuously variable valve lift mechanism according to any of the above-mentioned embodiments.

The vehicle and the above-mentioned control system for the continuously variable valve lift mechanism have the same advantages relative to the related art, which will not be elaborated herein.

A fourth objective of the present disclosure is to propose an apparatus, and with the apparatus, a vehicle may be guaranteed to be started and travel smoothly when a continuously variable valve lift mechanism fails and disables an automatic valve lift changing function.

To achieve the above-mentioned objective, the present disclosure provides the technical solution as follows.

An apparatus includes: one or a plurality of processors, a memory, and one or a plurality of programs stored in the memory. When executed by the one or the plurality of processors, the one or the plurality of programs execute the control method for the continuously variable valve lift mechanism according to the above-mentioned embodiments of the present disclosure.

The apparatus and the above-mentioned control method for the continuously variable valve lift mechanism have the same advantages relative to the related art, which will not be elaborated herein.

A fifth objective of the present disclosure is to propose a nonvolatile computer storage medium, and with the nonvolatile computer storage medium, a vehicle may be guaranteed to be started and travel smoothly when a continuously variable valve lift mechanism fails and disables an automatic valve lift changing function.

To achieve the above-mentioned objective, the present disclosure provides the technical solution as follows.

A nonvolatile computer storage medium stores one or a plurality of programs. When executed by one apparatus, the one or the plurality of programs enable the apparatus to execute the control method for the continuously variable valve lift mechanism according to the above-mentioned embodiments of the present disclosure.

The nonvolatile computer storage medium and the above-mentioned control method for the continuously variable valve lift mechanism have the same advantages relative to the related art, which will not be elaborated herein.

BRIEF DESCRIPTION OF THE DRAWINGS

The accompanying drawings which constitute a part of the present disclosure serve to provide a further understanding of the present disclosure, and exemplary embodiments of the present disclosure and explanation thereof are used for interpreting the present disclosure, without limiting the present disclosure improperly. In the drawings.

Figure 1:
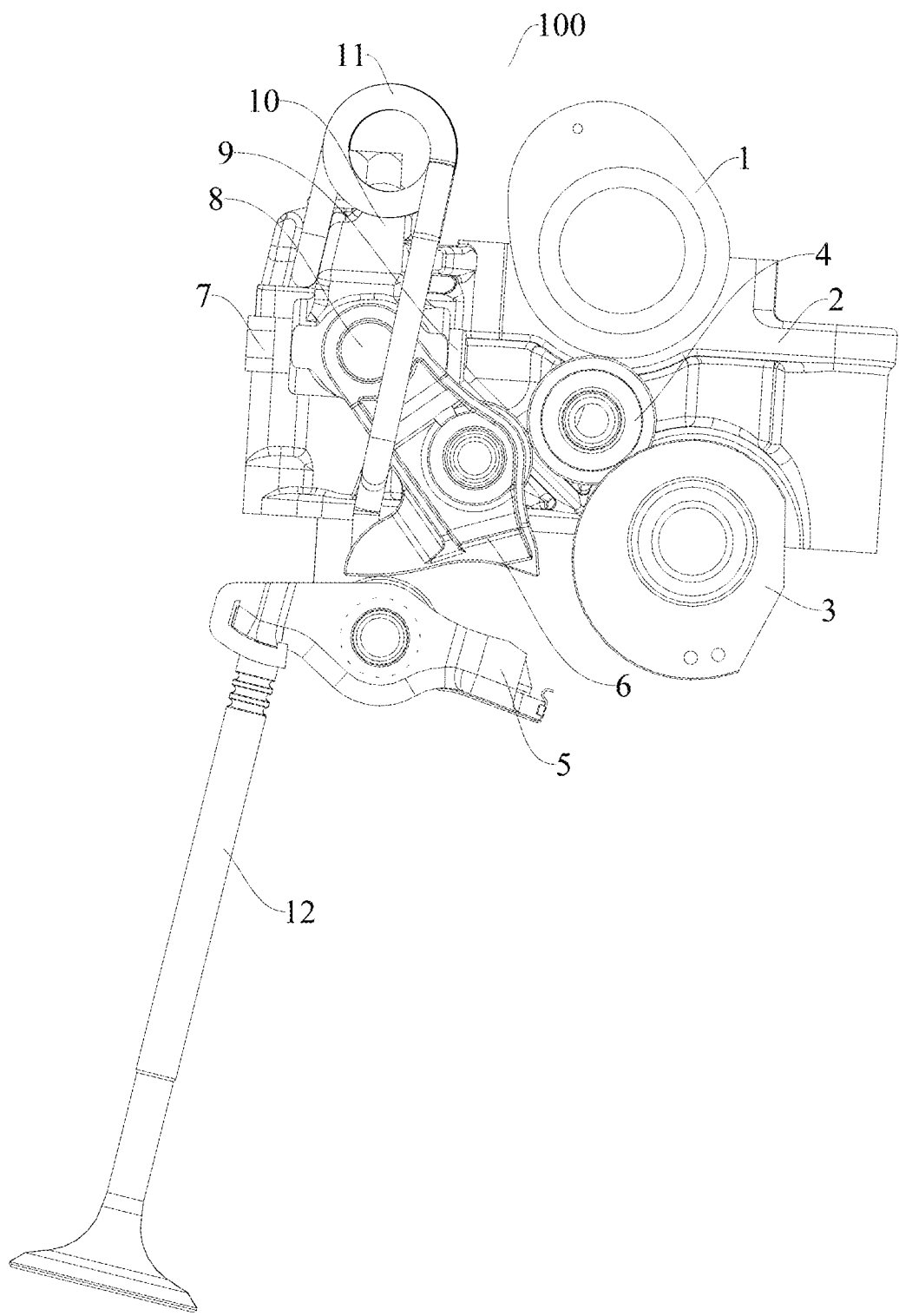
FIG. 1 is a schematic structural diagram of a continuously variable valve lift mechanism according to an embodiment of the present disclosure.

REFERENCE NUMERALS continuously variable valve lift mechanism 100; camshaft 1; supporting base 2; eccentric shaft 3; roller assembly 4; roller rocker 5; intermediate swing arm 6; outer regulating screw 7; intermediate swing arm pin shaft 8; inner regulating screw 9; fixed support 10; returning spring 11; valve 12; control system 500 for continuously variable valve lift mechanism; mode switching module 510; drive module 520.

DETAILED DESCRIPTION

It should be noted that the embodiments in the present disclosure and features in the embodiments may be combined mutually in the case of no conflicts.

The present disclosure will be described in detail below with reference to the drawings in conjunction with the embodiments.

As shown in FIG. 1, a continuously variable valve lift mechanism 100 may include a camshaft 1, a supporting base 2, an eccentric shaft 3, a roller assembly 4, a roller rocker 5, an intermediate swing arm 6, an outer regulating screw 7, an intermediate swing arm pin shaft 8, an inner regulating screw 9, a fixed support 10, a returning spring 11, a valve 12, a locating sleeve, a locating pin, a small camshaft cover, a cylinder head and an eccentric shaft driving device.

The camshaft 1, the eccentric shaft 3 and the fixed support 10 are all mounted on the supporting base 2, the camshaft 1 and the eccentric shaft 3 may rotate freely, and the supporting base 2 is mounted on the cylinder head.

The camshaft 1 is connected with a crankshaft of an engine, for example, by chain transmission. The camshaft 1 rotates to drive the roller assembly 4, a roller of the intermediate swing arm 6 is in close contact with the roller assembly 4 by means of the returning spring 11, and the roller assembly 4 transmits movement to the intermediate swing arm 6, which drives the roller rocker 5, thereby opening or closing the valve 12.

The eccentric shaft driving device is coupled to the eccentric shaft 3 dynamically, so as to control the eccentric shaft 3 to rotate clockwise or anticlockwise. The eccentric shaft driving device may be configured as a control electric motor, and an output shaft of the control electric motor may be configured as a worm. The eccentric shaft 3 may be fixedly connected with a worm gear, and the worm is engaged with the worm gear, such that the control electric motor is coupled to the eccentric shaft 3 dynamically.

The eccentric shaft 3 is fixedly connected with an eccentric wheel, and when the eccentric shaft 3 rotates, the eccentric wheel of the eccentric shaft 3 drives the roller assembly 4 to change a contact point between the roller assembly 4 and the roller of the intermediate swing arm 6, thereby regulating a lift and an opening duration of the valve.

The intermediate swing arm 6 is mounted on the fixed support 10 by means of the intermediate swing arm pin shaft 8, and the position of the intermediate swing arm pin shaft 8 may be fixed or regulated by the outer regulating screw 7 and the inner regulating screw 9, and changed by rotating the outer regulating screw 7 or the inner regulating screw 9, thereby regulating a center of rotation of the intermediate swing arm 6. Two intermediate swing arms 6 may be mounted to each fixed support 10, and the fixed support 10 is mounted on the supporting base 2.

A control method for the continuously variable valve lift mechanism according to an embodiment of the present disclosure will be described below.

The two valves 12 of the continuously variable valve lift mechanism 100 for the same cylinder may correspond to the eccentric wheels with different profiles. That is, the two valves 12 for the same cylinder may have the lifts which are not synchronous completely.

Figure 2:
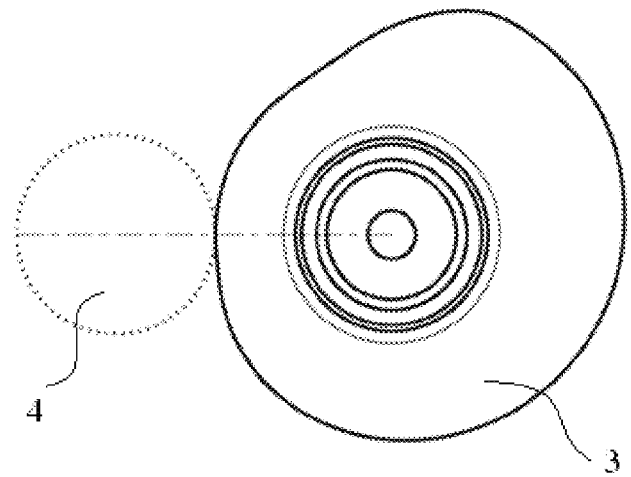
FIG. 2 is a schematic structural diagram of an eccentric shaft at a minimum lift position according to an embodiment of the present disclosure.
Figure 3:
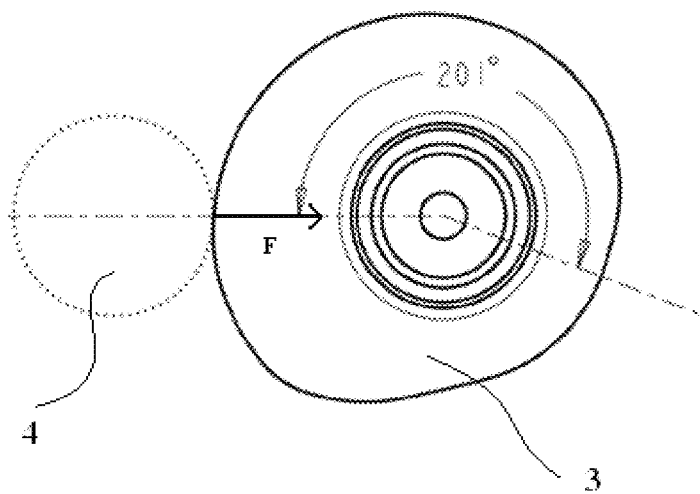
FIG. 3 is a schematic structural diagram of an eccentric shaft at a maximum lift position according to an embodiment of the present disclosure.

Firstly, it should be noted that the control method for the continuously variable valve lift mechanism according to the embodiment of the present disclosure is a control strategy for the continuously variable valve lift mechanism in the case of a failure of the continuously variable valve lift mechanism. Without failures, the continuously variable valve lift mechanism may be controlled according to a conventional control strategy. As shown in FIGS. 1 to 3, for example, when the continuously variable valve lift mechanism does not fail, spring forces of the returning spring 11 in contact with an intermediate push rod and a valve spring of a valve mechanism act on the intermediate push rod which comes into contact with the roller assembly 4, and a resultant force of the spring forces is transmitted to the roller assembly 4. The roller assembly 4 receives an acting force of the camshaft 1 at the same time. A resultant force received by the roller assembly 4 is transmitted onto the eccentric wheel of the eccentric shaft 3, and rotates the eccentric wheel to a small lift. A position of the eccentric shaft 3 is controlled by the control electric motor of the continuously variable valve lift mechanism (CVVL), and thus, a position of the eccentric wheel may be controlled under normal circumstances.

However, in some cases, for example, in the case where the continuously variable valve lift mechanism fails and disables an automatic valve lift changing function, the position of the eccentric wheel is not controlled actively, and if the continuously variable valve lift mechanism is not located nearby the maximum lift position, the eccentric wheel will rotate automatically to the small lift under the action of the received resultant force. If the eccentric wheel stays at the small lift position, cold start of the engine could not be performed.

It should be noted that the failure of the continuously variable valve lift mechanism disabling the automatic valve lift changing function includes, but not limited to, a failure of an electronic control component of the continuously variable valve lift mechanism and/or a failure of at least one phase in a three phase line of the electric motor, i.e., the failure of the electronic control component of the continuously variable valve lift mechanism (CVVL) and/or the failure of a certain phase in the three phase line of the electric motor.

Thus, with the control method for the continuously variable valve lift mechanism according to the embodiment of the present disclosure, in the case of failure of the continuously variable valve lift mechanism, a vehicle may be guaranteed to be started successfully and travel.

Figure 4:
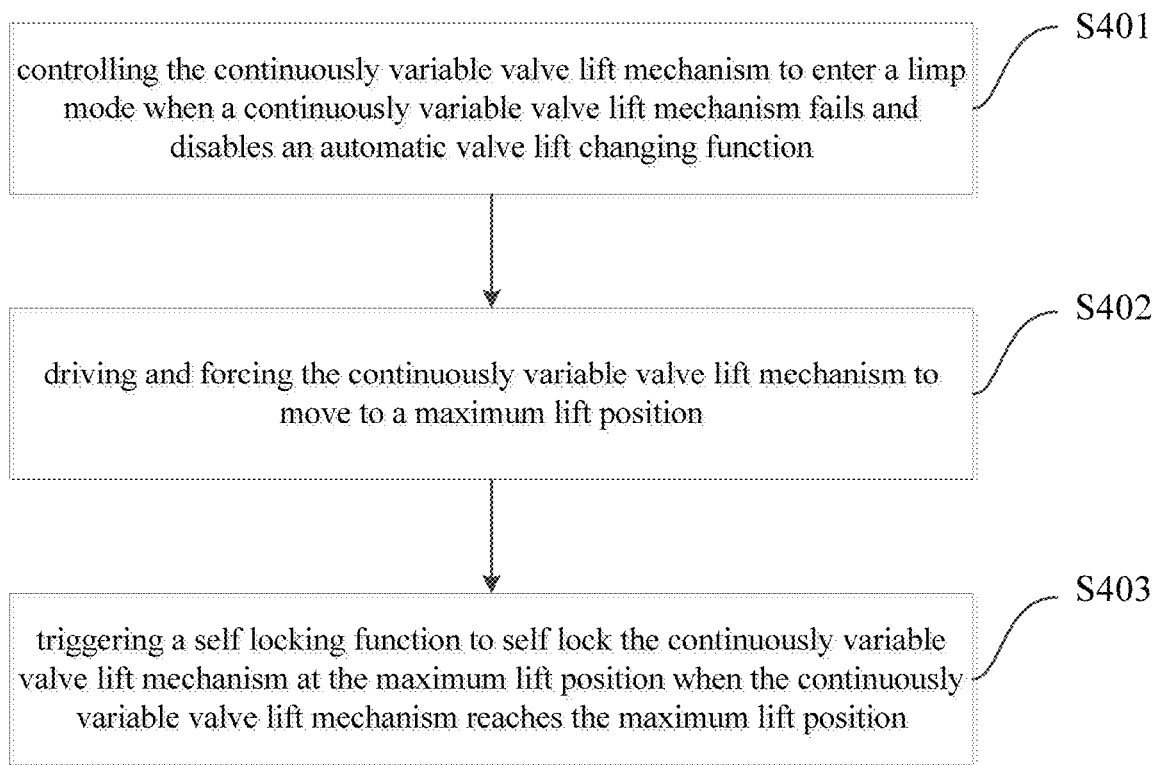
FIG. 4 is a flow chart of a control method for a continuously variable valve lift mechanism according to an embodiment of the present disclosure.

As shown in FIG. 4, the control method for the continuously variable valve lift mechanism according to one embodiment of the present disclosure includes the following steps.

S401: controlling a continuously variable valve lift mechanism to enter a limp mode when the continuously variable valve lift mechanism fails and disables an automatic valve lift changing function. The failure of the continuously variable valve lift mechanism disabling the automatic valve lift changing function includes the failure of the electronic control component of the continuously variable valve lift mechanism and/or the failure of at least one phase in the three phase line of the electric motor.

That is, the failure is present in the electronic control component of the continuously variable valve lift mechanism and a certain phase in the three phase line of the electric motor, and the conventional control strategy for the continuously variable valve lift mechanism is disabled. At this point, the limp mode of the continuously variable valve lift mechanism will be triggered.

S402: driving and forcing the continuously variable valve lift mechanism to move to the maximum lift position. After the limp mode of the continuously variable valve lift mechanism is triggered, the electric motor will force and drive the continuously variable valve lift mechanism to move to the maximum lift position.

S403: triggering a self locking function to self lock the continuously variable valve lift mechanism at the maximum lift position when the continuously variable valve lift mechanism reaches the maximum lift position.

The continuously variable valve lift mechanism is configured such that at the maximum lift position, the resultant force of the roller assembly of the continuously variable valve lift mechanism on the eccentric wheel has a direction passing through an axis of the eccentric shaft, so as to self lock the continuously variable valve lift mechanism at the maximum lift position when the continuously variable valve lift mechanism reaches the maximum lift position in the limp mode.

The continuously variable valve lift mechanism 100 is located at the maximum lift position and may prepare for starting the engine. Specifically, as shown in FIG. 3, the continuously variable valve lift mechanism 100 is configured such that at the maximum lift position, the resultant force F of the roller assembly of the continuously variable valve lift mechanism on the eccentric wheel has a direction passing through the axis of the eccentric shaft 3, so as to self lock the continuously variable valve lift mechanism 100 at the maximum lift position after self learning is successful. A pressure angle is greater than a friction angle for the profile of the eccentric wheel at the maximum lift, and the resultant force of the roller assembly on the eccentric wheel has the direction passing through the axis of the eccentric shaft 3. Thus, the eccentric wheel and the roller assembly are self locked, and the continuously variable valve lift mechanism 100 is self locked at the maximum lift position, such that the engine may be started smoothly, and particularly, the cold start may be performed smoothly.

Further, after the continuously variable valve lift mechanism is self locked at the maximum lift position, the method further includes: controlling an opening of the throttle valve to enable the vehicle to be started and travel. That is, after entering the limp mode, the continuously variable valve lift mechanism is self locked at the maximum lift position firstly, such that the engine may be started smoothly. Then, the opening of the throttle valve may be controlled by a driver, or the like, so as to control a load of the vehicle, and the driver may be facilitated to start the vehicle smoothly and drive the vehicle to a maintenance station for maintenance, which avoids the vehicle being incapable of traveling since the engine is unable to be started. That is, in the limp mode, by controlling the load through the throttle valve, the cold start, accelerating, decelerating, idling, or the like may be performed on the vehicle normally, and the vehicle may be guaranteed to be driven to a maintenance centre for maintenance.

With the control method for the continuously variable valve lift mechanism according to the embodiments of the present disclosure, when the continuously variable valve lift mechanism fails and disables an automatic valve lift changing function, the continuously variable valve lift mechanism is controlled to enter the limp mode, forced to move to the maximum lift position, and self locked at the maximum lift position after reaching the maximum lift position, thereby enabling the vehicle to be started and travel smoothly, facilitating the driver to drive the vehicle to the maintenance centre for maintenance, and increasing the efficiency of maintenance.

Figure 5:
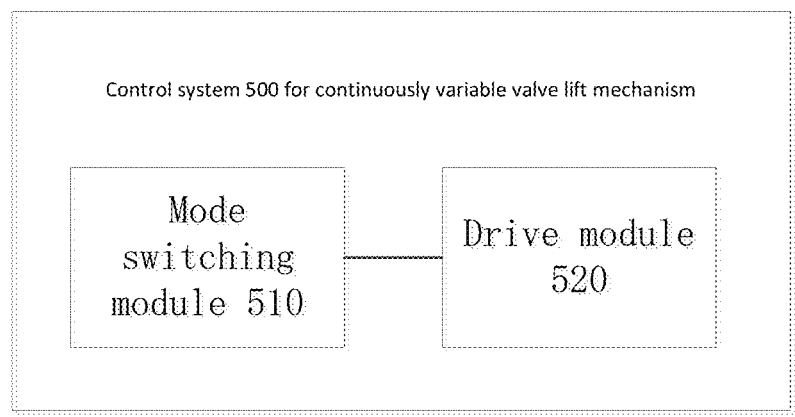
FIG. 5 is a structural block diagram of a control system for a continuously variable valve lift mechanism according to an embodiment of the present disclosure.

FIG. 5 is a structural block diagram of a control system for the continuously variable valve lift mechanism according to one embodiment of the present disclosure. As shown in FIG. 5, the control system 500 for the continuously variable valve lift mechanism according to the embodiment of the present disclosure includes a mode switching module 510 and a drive module 520.

The mode switching module 510 is configured to control the continuously variable valve lift mechanism to enter the limp mode when the continuously variable valve lift mechanism fails and disables the automatic valve lift changing function. The drive module 520 is configured to drive and force the continuously variable valve lift mechanism to move to the maximum lift position, and trigger the self locking function to self lock the continuously variable valve lift mechanism at the maximum lift position when the continuously variable valve lift mechanism reaches the maximum lift position.

In one embodiment of the present disclosure, the failure of the continuously variable valve lift mechanism disabling the automatic valve lift changing function includes the failure of the electronic control component of the continuously variable valve lift mechanism and/or the failure of at least one phase in the three phase line of the electric motor.

In one embodiment of the present disclosure, the continuously variable valve lift mechanism is configured such that at the maximum lift position, the resultant force of the roller assembly of the continuously variable valve lift mechanism on the eccentric wheel has the direction passing through the axis of the eccentric shaft, so as to self lock the continuously variable valve lift mechanism at the maximum lift position when the continuously variable valve lift mechanism reaches the maximum lift position in the limp mode.

In one embodiment of the present disclosure, the control system further includes: a control module (not shown in FIG. 5) configured to control the opening of the throttle valve to enable the vehicle to be started and travel after the continuously variable valve lift mechanism is self locked at the maximum lift position.

With the control system for the continuously variable valve lift mechanism according to the embodiments of the present disclosure, when the continuously variable valve lift mechanism fails and disables an automatic valve lift changing function, the continuously variable valve lift mechanism is controlled to enter the limp mode, forced to move to the maximum lift position, and self locked at the maximum lift position after reaching the maximum lift position, thereby enabling the vehicle to be started and travel smoothly, facilitating the driver to drive the vehicle to the maintenance centre for maintenance, and increasing the efficiency of maintenance.

It should be noted that a specific implementation of the control system for the continuously variable valve lift mechanism according to the embodiments of the present disclosure is similar to a specific implementation of the control method for the continuously variable valve lift mechanism according to the embodiments of the present disclosure, and refers to the description of the method for details, which will not be repeated herein to reduce redundancy.

Further, an embodiment of the present disclosure discloses a vehicle provided with the control system for the continuously variable valve lift mechanism according to any one of the above-mentioned embodiments. With the vehicle, when the continuously variable valve lift mechanism fails and disables an automatic valve lift changing function, the continuously variable valve lift mechanism is controlled to enter the limp mode, forced to move to the maximum lift position, and self locked at the maximum lift position after reaching the maximum lift position, thereby enabling the vehicle to be started and travel smoothly, facilitating the driver to drive the vehicle to the maintenance centre for maintenance, and increasing the efficiency of maintenance.

In addition, other configurations and functions of the vehicle according to the above-mentioned embodiments of the present disclosure are known to a person skilled in the art, which will not be repeated herein to reduce redundancy.

Further, an embodiment of the present disclosure discloses an apparatus including: one or a plurality of processors, a memory, and one or a plurality of programs stored in the memory. When executed by the one or the plurality of processors, the one or the plurality of programs execute the control method for the continuously variable valve lift mechanism according to the above-mentioned embodiments of the present disclosure. With the apparatus, the vehicle may be guaranteed to be started and travel smoothly when the continuously variable valve lift mechanism fails and disables the automatic valve lift changing function.

Further, an embodiment of the present disclosure discloses a nonvolatile computer storage medium configured to store one or a plurality of programs, and when executed by one apparatus, the one or the plurality of programs enable the apparatus to execute the control method for the continuously variable valve lift mechanism according to the above-mentioned embodiments of the present disclosure. With the nonvolatile computer storage medium, the vehicle may be guaranteed to be started and travel smoothly when the continuously variable valve lift mechanism fails and disables the automatic valve lift changing function.

The above are merely the preferred embodiments of the present disclosure and shall not be used to limit the present disclosure. Any modifications, equivalents and improvements made within the spirit and principle of the present disclosure shall fall within the protection scope of the present disclosure.

What is claimed is:

1. A vehicle, provided with a control system for a continuously variable valve lift mechanism comprising:
   a driver configured to drive and force the continuously variable valve lift mechanism to move to a maximum lift position, and trigger a self locking function to self lock the continuously variable valve lift mechanism at the maximum lift position when the continuously variable valve lift mechanism reaches the maximum lift position, wherein the continuously variable valve lift mechanism is configured such that at the maximum lift position, a resultant force of a roller assembly thereof on an eccentric wheel has a direction passing through an axis of an eccentric shaft, so as to self lock the continuously variable valve lift mechanism at the maximum lift position when the continuously variable valve lift mechanism reaches the maximum lift position in a limp mode.

2. The vehicle according to claim 1, wherein the control system comprises a processor configured to control an opening of a throttle valve to enable the vehicle to be started and travel after the continuously variable valve lift mechanism is self locked at the maximum lift position.

3. The vehicle according to claim 1, wherein the continuously variable valve lift mechanism comprises:
   a supporting base,
   a camshaft mounted on the supporting base and rotatable relative to the supporting base, the camshaft being provided with a cam;
   the eccentric shaft mounted on the supporting base and rotatable relative to the supporting base, the eccentric shaft being provided with the eccentric wheel;
   an intermediate swing arm mounted on the supporting base and pivotable relative to the supporting base, the intermediate swing arm being provided with a roller;
   the roller assembly in contact with the cam of the camshaft, the eccentric wheel of the eccentric shaft and the roller of the intermediate swing simultaneously; and
   a valve in contact with the intermediate swing arm, wherein the camshaft drives the valve to open and close via the roller assembly and the intermediate swing arm, and the eccentric shaft drives the roller assembly to change a contact point between the roller assembly and the roller of the intermediate swing arm to regulate a lift and an opening duration of the valve.

* * * * *